UNITED STATES PATENT OFFICE.

BERNHARD GRAU, OF KRATZWIECK, NEAR STETTIN, GERMANY.

TREATMENT OF BLAST-FURNACE SLAG FOR PRODUCTION OF HYDRAULIC CEMENT.

No. 905,813.   Specification of Letters Patent.   Patented Dec. 1, 1908.

Application filed September 22, 1906. Serial No. 335,845.

*To all whom it may concern:*

Be it known that I, BERNHARD GRAU, a subject of the German Emperor, residing at Kratzwieck, near Stettin, Germany, have invented new and useful Improvements in the Treatment of Blast-Furnace Slag for the Production of Hydraulic Cement, of which the following is a specification.

The present invention relates to a method of manufacturing hydraulic cement from the dross or slag of blast-furnaces, the molten slag being broken up by means of an addition of lime, consisting in a stream of steam, gas or air charged with powdered lime or the like being blown against an outflowing jet or stream of slag, and in the slag, which is thus disintegrated, being worked up into cement.

As is known, it has already been proposed to manufacture hydraulic cement from the dross or slag from blast-furnaces by introducing lime into the molten slag. The lime was blown into the molten mass of slag by means of a stream of gas, as in the Bessemer process. This method necessitated therefore a separate furnace or the like and much fuel. Or also the molten slag was conducted to a specially built spraying device, to which the lime was simultaneously led. This method is likewise troublesome and necessitates special apparatus; also it is doubtful whether the slag will mix sufficiently with the lime; in any case the temperature of the slag is reduced so much by the disintegration that a chemical incorporation with lime is scarcely possible. Further it has already been proposed to mix the red-hot molten slag in spray form with previously warmed lime-powder or the like. This method likewise necessitates a special expenditure of heat, as otherwise only the upper layer takes up lime and then at once becomes stiff, so that the lower layer does not obtain any more lime. All these disadvantages are avoided, in accordance with the present invention, by the disintegration of the slag taking place in such a way that a stream of steam, gas or air, preferably in a hot or super-heated state, suitably charged with lime (*i. e.* quick or slaked lime, limestone, or cement) in as powdered a form as possible, is blown against an outflowing jet or stream of slag. Slag treated in this manner may be further cooled at once artificially, quickly or slowly, at or immediately after its disintegration, or may be left in heaps to cool of its own accord. In the latter case the blast will be arranged in such a way that the disintegrated slag falls as far as possible in one heap which is then left to cool down by itself without artificial means.

As already indicated above, the lime may be used in the form of quick or slaked lime, or in the form of finely-ground limestone which may also contain silica, or also be in the form of hydraulic lime or cement. Absolutely every compound of lime is suitable in the case of which the secondary constituents do not exercise an injurious action; only the percentage of lime and the compound of lime must be such that the cement which is to be manufactured receives the necessary basicity. Also the word "lime" is to be understood in this sense in this specification for the present invention.

In order to regulate the supply of lime, the powdered lime may be allowed to flow to the jet-blower, which may be a blast of steam, air or gas, in such a way that either the quantity of the supply is regulated by a tap or sliding-valve arranged in the supply-pipe, or by the jet of steam, air or gas being increased or diminished.

The disintegrated slag-lime-product obtained as hereindescribed can be worked up into cement ready for use in any suitable manner *e. g.* by simply grinding the same which may be mixed with any desired additional substances such as lime, Portland-cement, gypsum, etc.

I am aware that it is old to add lime to fluid slag, but it is not old to add the lime to the slag stream in such a manner that the mixing and chemical combination of the lime with the slag take place at once and in the same moment thus obtaining a mass which after having been allowed to cool in heaps of its own accord, can be ground at once as a hydraulic cement fit for immediate use, thus dispensing with the mixing or heating devices previously used, after the lime has been brought in contact with the fluid slag.

I do not generally claim in the production of hydraulic cement the addition of lime or calcareous matter to a stream of fluid slag and further I do not claim the disintegrating of slag mixed with lime by steam, but

What I claim as my invention is:

1. A process of making hydraulic cement which consists in simultaneously disintegrating fluid slag and combining therewith lime in proper proportion by blowing a gaseous stream charged with powdered lime against a jet of molten slag with such force that the latter is disintegrated, and subsequently grinding the disintegrated mass thus combined, after it has cooled, whereby a complete cement is directly obtained.

2. A process of making hydraulic cement which consists in simultaneously disintegrating the slag and combining therewith lime in proper proportion by blowing a gaseous stream charged with powdered lime against a jet of molten slag with such force that the latter is disintegrated, permitting the combined and disintegrated mass to fall a suitable distance and subsequently after said mass has cooled, grinding the same, whereby a complete cement is directly obtained.

3. A process of making hydraulic cement which consists in simultaneously disintegrating fluid slag and combining therewith lime in proper proportion by blowing a jet of steam charged with lime against a stream of molten slag and grinding the mass thus disintegrated after it has cooled.

4. A process of making hydraulic cement which consists in blowing a jet of steam charged with lime against a stream of molten slag as it issues from a furnace, permitting the mass thus disintegrated to fall to the ground and cool gradually of its own accord, and subsequently grinding the same.

In testimony whereof I have signed my name to this specification, in the presence of two subscribing witnesses.

BERNHARD GRAU.

Witnesses:
BRUNO F. KOHN,
HANS HILDEBRAND.